(12) United States Patent
Gong et al.

(10) Patent No.: US 12,717,152 B2
(45) Date of Patent: Aug. 25, 2026

(54) PROJECTION OPTICAL PATH AND PROJECTION DEVICE

(71) Applicant: GOERTEK OPTICAL TECHNOLOGY CO., LTD., Weifang (CN)

(72) Inventors: Jingjian Gong, Weifang (CN); Yangchun Deng, Weifang (CN); Weitao Ding, Weifang (CN); Dean Liu, Weifang (CN); Gongtao Lu, Weifang (CN)

(73) Assignee: GOERTEK OPTICAL TECHNOLOGY CO., LTD., Weifang (CN)

( * ) Notice: Subject to any disclaimer, the term of this patent is extended or adjusted under 35 U.S.C. 154(b) by 501 days.

(21) Appl. No.: 18/036,790

(22) PCT Filed: Jun. 23, 2021

(86) PCT No.: PCT/CN2021/101676
§ 371 (c)(1),
(2) Date: May 12, 2023

(87) PCT Pub. No.: WO2022/100100
PCT Pub. Date: May 19, 2022

(65) Prior Publication Data

US 2023/0408894 A1 Dec. 21, 2023

(30) Foreign Application Priority Data

Nov. 13, 2020 (CN) ......................... 202022637744.8
Mar. 26, 2021 (CN) ......................... 202120623773.0

(51) Int. Cl.
*G02B 27/10* (2006.01)
*G03B 21/20* (2006.01)

(52) U.S. Cl.
CPC ....... *G02B 27/102* (2013.01); *G03B 21/2013* (2013.01)

(58) Field of Classification Search
CPC .......................... H04N 9/3164; G03B 21/2013
See application file for complete search history.

(56) References Cited

U.S. PATENT DOCUMENTS 8,955,985 B2 2/2015 Matsubara et al.
10,416,545 B2 9/2019 Wang et al.
(Continued)

FOREIGN PATENT DOCUMENTS

CN 102330888 A 1/2012
CN 202995240 U 6/2013
(Continued)

OTHER PUBLICATIONS

International Search Report from International Application No. PCT/CN2021/101676 mailed Sep. 24, 2021.

*Primary Examiner* — Alexander P Gross
(74) *Attorney, Agent, or Firm* — Shih IP Law Group, PLLC.

(57) ABSTRACT

The projection optical path comprises a triple light source system emitting a first converged light and a single light source system emitting a light with a monochromatic wavelength. The triple light source system comprises a second converged light converged with a light with a first wavelength to form the first converged light. The single light source system comprises a third light source. The light with the first wavelength, the light with the second wavelength, and the light with the third wavelength are respectively one of red light, green light, blue light, a wavelength range of a light with a fourth wavelength is within a wavelength range of the red light. The wavelength of the light with the fourth wavelength is defined as λ1; the wavelength of the red light (Continued)

among the lights with the three wavelengths is λ2, and λ1≠λ2.

7 Claims, 2 Drawing Sheets

(56) References Cited

U.S. PATENT DOCUMENTS

| | | | | |
|---|---|---|---|---|
| 2006/0274284 | A1* | 12/2006 | Peterson .............. | G02B 27/149<br>348/E9.027 |
| 2009/0262308 | A1 | 10/2009 | Ogawa | |
| 2011/0279782 | A1 | 11/2011 | Huang | |
| 2014/0240676 | A1* | 8/2014 | Maes .................. | H04N 9/3158<br>362/583 |
| 2017/0307969 | A1 | 10/2017 | Kawasumi et al. | |
| 2021/0255534 | A1* | 8/2021 | Pettitt .................. | G02B 27/141 |
| 2021/0373429 | A1* | 12/2021 | Zhai ....................... | G03B 21/16 |

FOREIGN PATENT DOCUMENTS

| | | | |
|---|---|---|---|
| CN | 105223761 | A | 1/2016 |
| CN | 105474073 | A | 4/2016 |
| JP | 2012203344 | A | 10/2012 |
| JP | 2019185002 | A | 10/2019 |
| WO | 2018006656 | A1 | 1/2018 |

* cited by examiner

PROJECTION OPTICAL PATH AND PROJECTION DEVICE

This application claims the priorities and benefits of Chinese Patent Application No. 202022637744.8, titled "PROJECTION OPTICAL PATH AND PROJECTION DEVICE", filed on Nov. 13, 2020, and Chinese Patent Application No. 202120623773.0, titled "PROJECTION OPTICAL PATH AND PROJECTION DEVICE", filed on Mar. 26, 2021, which are incorporated by reference as if fully set forth herein.

TECHNICAL FIELD

The present disclosure relates to the technical field of optical display, particularly, to a projection optical path and a projection device.

BACKGROUND ART

In optical projection display, a combination of red light, green light and blue light is used as a projection light source. In order to improve the brightness of the projection screen, it is necessary to increase the amount of light rays of corresponding colors, that is, increase the luminous flux. The current method of increasing the luminous flux is to increase the current of corresponding power supply, so that light sources corresponding to the three colors can generate more light rays. However, the red light source is relatively sensitive to temperature, and when the current increases to a certain level, the amount of red light rays increases, resulting in a thermal effect, which leads to a sudden drop in the light emitting efficiency of the red light source. To this end, using two kinds of red light sources to cooperate with each other, so as to reduce thermal effect generated by the red light source. However, the light emitting efficiency of light sources having other colors is still low, and it is difficult to effectively improve the overall brightness of the projection screen.

SUMMARY

In view of the above, in order to solve the problem that in the existing projection light source, when using two kinds of red light sources to cooperate with each other so as to reduce thermal effect generated by the red light source, the light emitting efficiency of light sources having other colors is relatively low and it is difficult to effectively improve the overall brightness of the projection screen, it is necessary to provide a projection optical path and a projection device capable of improving the light emitting efficiency of light sources having other colors while reducing thermal effect generated by a red light source, thereby effectively improving the overall brightness of the display screen.

In order to achieve the above object, the present disclosure provides a projection optical path, the projection optical path includes:

a triple light source system emitting a first converged light;

a single light source system emitting a light with a monochromatic wavelength, wherein the first converged light and the light with the monochromatic wavelength are crossed and converged;

wherein the triple light source system includes a first light source, a second light source and a fourth light source, the first light source emits a light with a first wavelength, the second light source emits a light with a second wavelength, the fourth light source emits a light with a fourth wavelength, the light with the second wavelength and the light with the fourth wavelength are converged to form a second converged light, the second converged light and the light with the first wavelength are converged to form the first converged light, and the single light source system includes a third light source, the third light source emits a light with a third wavelength, the light with the first wavelength, the light with the second wavelength and the light with the third wavelength have different colors, the light with the first wavelength, the light with the second wavelength, and the light with the third wavelength are respectively one of red light, green light, and blue light, a wavelength range of the light with the fourth wavelength is within a wavelength range of the red light, wherein a wavelength of the light with the fourth wavelength is defined as $\lambda 1$, the wavelength of the red light among the light with the first wavelength, the light with the second wavelength, and the light with the third wavelength is $\lambda 2$, and $\lambda 1 \neq \lambda 2$; and an excitation light source emitting an excitation light, wherein the excitation light is emitted to the triple light source system or the single light source system.

Optionally, the triple light source system further includes a first beam splitter, the first beam splitter is disposed at a crossing position of the second converged light and the light with the first wavelength, and the excitation light source is disposed at a side of the first beam splitter away from the second light source;

wherein the first light source is a green light source, a surface of the first beam splitter facing the excitation light source is provided with a reflective film for the excitation light, and the excitation light is reflected by the first beam splitter towards the first light source;

or, wherein the second source is a green light source, a surface of the first beam splitter facing the excitation light source is provided with an anti-reflection film for the excitation light, and the excitation light is transmitted towards the second light source.

Optionally, the triple light source system further includes a second beam splitter, the second beam splitter is disposed at a crossing position of the light with the second wavelength and the light with the fourth wavelength, a surface of the second beam splitter facing the second light source is provided with an anti-reflection film for the light with the second wavelength, and a surface of the second beam splitter facing the fourth light source is provided with a reflective film for the light with the fourth wavelength.

Optionally, the projection optical path further includes a third beam splitter, the third beam splitter is disposed at a crossing position of the first converged light and the light with the third wavelength, wherein the light with the first wavelength, the light with the second wavelength, the light with the third wavelength and the light with the fourth wavelength are converged by the third beam splitter so as to be emitted.

Optionally, the light with the first wavelength is a green light, the light with the second wavelength is a red light, and the light with the third wavelength is a blue light, a surface of the third beam splitter facing the first light source is provided with an anti-reflection film for the green light and the red light, and a surface of the third beam splitter facing the third light source is provided with a reflective film for the blue light.

Optionally, the second light source and the third light source are disposed on an upper side of an emitting optical path of the light with the first wavelength, the excitation light source is disposed on a lower side of the emitting optical path of the light with the first wavelength, and the first light source and the fourth light source are disposed on a left side of the emitting optical path of the light with the second wavelength, and a surface of the first beam splitter, a surface of the second beam splitter and a surface of the third beam splitter are parallel to each other.

Optionally, the second light source is disposed on an upper side of an emitting optical path of the light with the first wavelength, the third light source and the excitation light source are disposed on a lower side of the emitting optical path of the light with the first wavelength, and the first light source and the fourth light source are disposed on a left side of the emitting optical path of the light with the second wavelength, wherein a surface of the first beam splitter and a surface of the second beam splitter are parallel to each other, and the surface of the first beam splitter is orthogonal to a surface of the third beam splitter.

Optionally, the second light source is disposed on an upper side of an emitting optical path of the light with the first wavelength, the third light source and the excitation light source are disposed on a lower side of the emitting optical path of the light with the first wavelength, the first light source is disposed on a left side of an emitting optical path of the light with the second wavelength, and the fourth light source is disposed on a right side of the emitting optical path of the light with the second wavelength, wherein a surface of the second beam splitter and a surface of the third beam splitter are parallel to each other, and a surface of the first beam splitter is orthogonal to the surface of the third beam splitter.

Optionally, the projection optical path includes a first light emitting end surface, the first light emitting end surface is perpendicular to an emitting direction of the light with the first wavelength, the light with the first wavelength, the light with the second wavelength and the light with the fourth wavelength are transmitted through the third beam splitter, and the light with the third wavelength is reflected by the third beam splitter; the light with the first wavelength, the light with the second wavelength, the light with the third wavelength and the light with the fourth wavelength are converged by the third beam splitter, and the converged light of the light with the first wavelength, the light with the second wavelength, the light with the third wavelength and the light with the fourth wavelength is emitted from the first light emitting end surface.

Optionally, the projection optical path includes a second light emitting end surface, the second light emitting end surface is parallel to the emitting direction of the light with the first wavelength; the light with the first wavelength, the light with the second wavelength and the light with the fourth wavelength are reflected by the third beam splitter, and the light with the third wavelength is transmitted through the third beam splitter; the light with the first wavelength, the light with the second wavelength, the light with the third wavelength and the light with the fourth wavelength are converged by the third beam splitter, and the converged light of the light with the first wavelength, the light with the second wavelength, the light with the third wavelength and the light with the fourth wavelength is emitted from the second light emitting end surface.

In addition, in order to achieve the above object, the present disclosure further provides a projection device including a housing and the above-mentioned projection optical path, wherein the projection optical path is disposed in the housing.

According to the technical solution of the present disclosure, the light with the second wavelength emitted by the second light source of the triple light source system and the light with the fourth wavelength emitted by the fourth light source are converged to form a second convergent light, and the light with the first wavelength emitted by the first light source and the second convergent light are converged to form the first convergent light. The light with the third wavelength emitted by the third light source of the single light source system is emitted to the first convergent light, so that the convergence of four paths of light is completed. Wherein, the light with the first wavelength, the light with the second wavelength, and the light with the third wavelength are respectively one of red light, green light, and blue light, and the lights of three colors are combined to become a light source of a projection screen. The fourth light source is also a red light, as such, when increasing the brightness of the projection screen, the red color of the projection light source is provided by two light sources, which reduces the occurrence of thermal effect in a single red light source, and reduces a sudden drop in the light emitting efficiency, so as to ensure that the projection light source can operate stably.

In addition, the red wavelength of the light with the fourth wavelength is different from the wavelength of red light in the first light source, the second light source or the third light source. Accordingly, the projection optical path can be divided into multiple paths for transmission, which reduces the mutual interference between the light with the fourth wavelength of the fourth light source and the red light in the other three light sources, and ensures that lights are converged at the same position and then emitted.

Further, the triple light source system includes a first light source, a second light source and a fourth light source, and the third light source is disposed in the single light source system, and the triple light source system and the single light source system can be installed independently. Therefore, the installation of the light sources in the projection optical path is completed through two times of installations, so that the installation efficiency is improved.

Further, providing two light source systems so as to facilitate a rapid placement, in this way, the design of optical path can be simplified.

Further, by providing an excitation light source, the excitation light of the excitation light source is emitted to the triple light source system or the single light source system, so that the light emitting efficiency is improved.

BRIEF DESCRIPTION OF THE DRAWINGS

In order to explain the technical solutions of the embodiments of the present disclosure or in the prior art more clearly, the following will briefly illustrate the accompanying drawings required for the description of the embodiments or the prior art. Obviously, the drawings in the following description are only part of the drawings of the present disclosure, and for those skilled in the art, other drawings can also be obtained according to the provided drawings without any creative effort.

EXPLANATION OF REFERENCE NUMERALS

Figure 1:
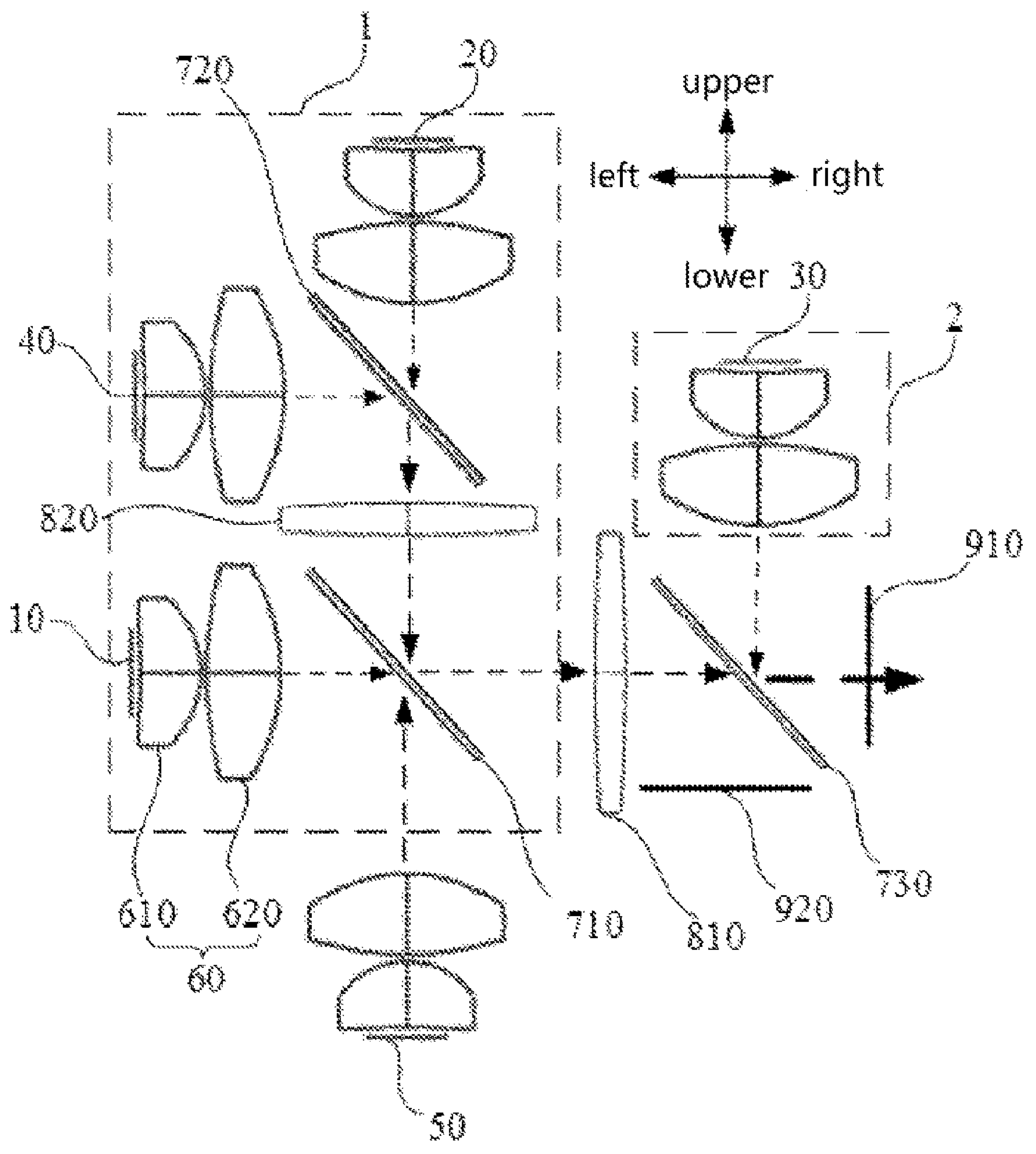
FIG. 1 is a structural schematic diagram of a projection optical path according to a first embodiment of the present disclosure.

| Reference Numeral | Name |
|---|---|
| 1 | triple light source system |
| 2 | single light source system |
| 10 | first light source |
| 20 | second light source |
| 30 | third light source |
| 40 | fourth light source |
| 50 | excitation light source |
| 60 | collimating lens group |
| 610 | first collimating lens |
| 620 | second collimating lens |
| 710 | first beam splitter |
| 720 | second beam splitter |
| 730 | third beam splitter |
| 810 | first condenser lens |
| 820 | second condenser lens |
| 910 | first light emitting end surface |
| 920 | second light emitting end surface |

The realization, functional features and advantages of the present disclosure will be further described with reference to accompanying drawings in conjunction with the embodiments.

DETAILED DESCRIPTION OF THE EMBODIMENTS

The technical solutions of the embodiments of the present disclosure will be described below with reference to the drawings. Obviously, the described embodiments are only part of the embodiments of the present disclosure, rather than all the embodiments. Based on the embodiments according to the present disclosure, all other embodiments obtained by persons of ordinary skill in the art without creative efforts shall fall within the protection scope of the present disclosure.

In optical projection display, a combination of red, green and blue lights is used as a projection light source. In order to improve the brightness of the projection screen, the current of corresponding power supply is generally increased, so that light sources corresponding to the three colors can generate more light rays. However, the red light source is relatively sensitive to temperature, and when the current increases to a certain level, the amount of red light increases, resulting in a thermal effect, which leads to a sudden drop in the light emitting efficiency of the red light source. To this end, using two kinds of red light sources to cooperate with each other, so as to reduce thermal effect produced by the red light source. However, the light emitting efficiency of light sources having other colors is still low, and it is difficult to effectively improve the overall brightness of the projection screen.

In order to solve the above problems, referring to FIG. 1, the present disclosure provides a projection optical path, which includes a triple light source system 1, a single light source system 2 and an excitation light source 50. The triple light source system 1 emits a first converged light, the single light source system 2 emits a light with a monochromatic wavelength, and the first converged light and the light with the monochromatic wavelength are cross-converged. The triple light source system 1 includes a first light source 10, a second light source and a fourth light source 40, the first light source 10 emits a light with a first wavelength, the second light source 20 emits a light with a second wavelength, the fourth light source 40 emits a light with a fourth wavelength, the light with the second wavelength and the light with the fourth wavelength are converged to form a second converged light, the second converged light and the light with the first wavelength are converged to form the first converged light. The single light source system 2 includes a third light source 30, the third light source 30 emits a light with a third wavelength; the light with the first wavelength, the light with the second wavelength and the light with the third wavelength have different colors, the light with the first wavelength, the light with the second wavelength, and the light with the third wavelength are respectively one of red light, green light, and blue light. That is, when the light with the first wavelength is a green light, the light with the second wavelength may be a red light, and the light with the third wavelength may be a blue light; or, when the light with the first wavelength is a green light, the light with the second wavelength may be a blue light, and the light with the third wavelength may be a red light. Alternatively, when the light with the first wavelength is a red light, the light with the second wavelength may be a green light, and the light with the third wavelength may be a blue light; or, when the light with the first wavelength is a red light, the light with the second wavelength may be a blue light, and the light with the third wavelength may be a green light. Alternatively, when the light with the first wavelength is a blue light, the light with the second wavelength may be a green light, and the light with the third wavelength may be a red light; or, when the light with the first wavelength is a blue light, the light with the second wavelength may be a red light, and the light with the third wavelength may be a green light. The colors of the light with the first wavelength, the light with the second wavelength and the light with the third wavelength are selected among red light, green light and blue light, and the colors of the three wavelength lights are different from each other. A wavelength range of the light with the fourth wavelength is within a wavelength range of the red light; the wavelength of the light with the fourth wavelength is defined as $\lambda 1$, the wavelength of the one among the light with the first wavelength, the light with the second wavelength and the light with the third wavelength set as the red light is $\lambda 2$, and $\lambda 1 \neq \lambda 2$. As an example, the wavelength of red light is in a range between 600 nm and 740 nm, if the light with the first wavelength is a red light, and the wavelength $\lambda 2$ of the light with the first wavelength is 620 nm, then the wavelength $\lambda 1$ of the light with the fourth wavelength is 650 nm. As another example, if the wavelength $\lambda 2$ of the light with the first wavelength is 625 nm, the wavelength $\lambda 1$ of the light with the fourth wavelength is 660 nm. Wherein, the first light source 10, the second light source 20, the third light source 30 and the fourth light source 40 may be light-emitting diodes (LEDs), or may be laser diodes (LDs), or may also be super luminescent diodes (SLDs). Monochromatic wavelength light is the wavelength light of a certain color. Monochromatic wavelength light has a certain wavelength range.

An excitation light source 50 emits an excitation light, and the excitation light is emitted to the triple light source system 11 or the single light source system 2. The excitation light source 50 is a pumping lamp. For example, the excitation light is a blue light, and the blue excitation light is emitted to the first light source 10 or the second light source 20, thereby increasing the fluorescent molecules of corresponding light source, and correspondingly increasing the emitting amount of light rays of corresponding light source.

In addition, it is known to those skilled in the art that the light emitted by any light source is a light beam with a certain wavelength range, therefore the light with the first wavelength in the present disclosure refers to a light beam with the first wavelength as a dominant wavelength, and the wavelength of the light with the first wavelength in the present disclosure refers to the dominant wavelength of the light with the first wavelength. Correspondingly, the same is adapted to the light with the second wavelength, the light with the third wavelength and the light with the fourth wavelength. Wherein, the dominant wavelength may also be understood as a central wavelength.

According to the technical solution of the present disclosure, the light with the second wavelength emitted by the second light source 20 of the triple light source system 1 and the light with the fourth wavelength emitted by the fourth light source 40 are converged to form a second convergent light, and the light with the first wavelength emitted by the first light source 10 and the second convergent light are converged to form the first convergent light. The light with the third wavelength emitted by the third light source 30 of the single light source system 2 is emitted to the first convergent light, so that the convergence of four paths of light is completed. Wherein, the light with the first wavelength, the light with the second wavelength, and the light with the third wavelength are respectively one of red light, green light, and blue light, and the lights of three colors are combined to become a light source of a projection screen. The fourth light source is also a red light, as such, when increasing the brightness of the projection screen, the red color of the projection light source is provided by two light sources, which reduces the occurrence of thermal effect in a single red light source, and reduces a sudden drop in the light emitting efficiency, so as to ensure that the projection light source can operate stably.

In addition, the red wavelength of the light with the fourth wavelength is different from the wavelength of red light in the first light source 10, the second light source 20 or the third light source 30. Accordingly, the projection optical path can be divided into multiple paths for transmission, which reduces the mutual interference between the light with the fourth wavelength of the fourth light source 40 and the red light in the other three light sources, and ensures that lights are converged at the same position and then emitted.

Further, the triple light source system 1 includes a first light source 10, a second light source 20 and a fourth light source 40, and the third light source 30 is disposed in the single light source system 2, and the triple light source system 1 and the single light source system 2 can be installed independently. Therefore, the installation of the light sources in the projection optical path is completed through two times of installations, so that the installation efficiency is improved.

Further, providing two light source systems so as to facilitate a rapid placement, in this way, the design of optical path can be simplified.

Further, by providing an excitation light source, the excitation light of the excitation light source 50 is emitted to the triple light source system 1 or the single light source system 2, so that the light emitting efficiency is improved. After the excitation light is emitted to the green light source, the fluorescent molecules of the green light source can be increased. It can be seen from this that the excitation light is emitted to the green light source, and which one of the light sources is a green light source, the excitation light will be emitted to such a light source.

In the above embodiment, in order to ensure that the excitation light can be accurately emitted to the first light source 10 or the second light source 20, the triple light source system 1 further includes a first beam splitter 710, the first beam splitter 710 is disposed at a crossing position of the second converged light and the light with the first wavelength, and the excitation light source 50 is disposed at a side of the first beam splitter 710 away from the second light source 20.

The first light source 10 is a green light source, a surface of the first beam splitter 710 facing the excitation light source 50 is provided with a reflective film for the excitation light, and the excitation light is reflected towards the first light source 10 by the first beam splitter 710; the excitation light is a blue light, the blue excitation light is reflected by the first beam splitter 710 and emitted to the first light source 10, thereby increasing the fluorescent molecules of green light, and accordingly increasing the emitting amount of green light.

Alternatively, the second source 20 is a green light source, a surface of the first beam splitter 710 facing the excitation light source 50 is provided with an anti-reflection film for the excitation light, and the excitation light is transmitted to the second light source 20. The blue excitation light is transmitted through the first beam splitter 710 and emitted to the second light source 20, thereby increasing the fluorescent molecules of green light, and accordingly increasing the emitting amount of green light.

In the above embodiment, in order to effectively converge the light with the second wavelength and the light with the fourth wavelength, the triple light source system 1 further includes a second beam splitter 720, the second beam splitter 720 is disposed at a crossing position of the light with the second wavelength and the light with the fourth wavelength, a surface of the second beam splitter 720 facing the second light source 20 is provided with an anti-reflection film for the light with the second wavelength, and a surface of the second beam splitter 720 facing the fourth light source 40 is provided with a reflective film for the light with the fourth wavelength. By means of reflecting the light with the fourth wavelength by the second beam splitter 720 and transmitting the light with the second wavelength by the second beam splitter 720, the light with the second wavelength and the light with the fourth wavelength are emitted from the same surface of the second beam splitter 720, so that the convergence of the light with the second wavelength and the light with the fourth wavelength is completed. Wherein, the anti-reflection film for the light with the second wavelength and the reflective film for the light with the fourth wavelength may be disposed on the same surface of the second beam splitter 720, or may be disposed on both surfaces of the second beam splitter 720 respectively.

In order to effectively converge the light with the third wavelength and the first converged light, the projection optical path further includes a third beam splitter 730, the third beam splitter 730 is disposed at a crossing position of the first converged light and the light with the third wavelength, wherein the light with the first wavelength, the light with the second wavelength, the light with the third wavelength and the light with the fourth wavelength are converged by the third beam splitter 730 so as to be emitted.

Specifically, the projection optical path includes a first light emitting end surface 910, the first light emitting end surface 910 is perpendicular to an exit direction of the light with the first wavelength; the light with the first wavelength, the light with the second wavelength and the light with the fourth wavelength are transmitted through the third beam splitter 730, the light with the third wavelength is reflected by the third beam splitter 730, the light with the first wavelength, the light with the second wavelength, the light with the third wavelength and the light with the fourth wavelength are converged by the third beam splitter 730 and the converged light of the light with the first wavelength, the light with the second wavelength, the light with the third wavelength and the light with the fourth wavelength is emitted from the first light emitting end surface 910. Wherein, a surface of the third beam splitter 730 facing the first beam splitter 710 is provided with an anti-reflection film for the light with the first wavelength, the light with the second wavelength and the light with the fourth wavelength, and a surface of the third beam splitter 730 facing the third light source 30 is provided with a reflective film for the light with the third wavelength. Thereby, in a case where the light with the first wavelength, the light with the second wavelength and the light with the fourth wavelength are transmitted through the third beam splitter 730, and the light with the third wavelength is reflected by the third beam splitter 730, the light with the first wavelength, the light with the second wavelength, the light with the third wavelength and the light with the fourth wavelength can be converged and combined, and the converged light is emitted from the first light emitting end surface 910. Wherein, the anti-reflection film for the light with the first wavelength, the light with the second wavelength and the light with the fourth wavelength and the reflective film for the light with the third wavelength may be disposed on the same surface of the third beam splitter 730, or may be disposed on both surfaces of the third beam splitter 730 respectively.

For example, the light with the first wavelength is a green light, the light with the second wavelength is a red light, and the light with the third wavelength is a blue light, a surface of the third beam splitter 730 facing the first light source 10 is provided with an anti-reflection film for the green light and red light, and a surface of the third beam splitter 730 facing the third light source 30 is provided with a reflective film for the blue light. The wavelength range of the green light is close to that of the red light, so that a higher transmittance can be obtained when they passing through the third beam splitter 730. Likewise, the light with the second wavelength and the light with the fourth wavelength are both red lights with different wavelengths and similar wavelength ranges, and a higher transmittance rate can be obtained when they passing through the third beam splitter 730. Therefore, the three light source system 1 includes a green light source and a red light source, and the single light source system includes a blue light source, as such, the light emitting amount can be further improved, and the decreasing of light emitting amount due to a large wavelength range difference can be reduced.

In addition, the embodiment also provides another light emitting direction, the projection optical path includes a second light emitting end surface 920, the second light emitting end surface 920 is parallel to the emitting direction of the light with the first wavelength; the light with the first wavelength, the light with the second wavelength and the light with the fourth wavelength are reflected by the third beam splitter 730, the light with the third wavelength is transmitted through the third beam splitter 730, the light with the first wavelength, the light with the second wavelength, the light with the third wavelength and the light with the fourth wavelength are converged by the third beam splitter 730 and the converged light of the light with the first wavelength, the light with the second wavelength, the light with the third wavelength and the light with the fourth wavelength is emitted from the second light emitting end surface 920. Wherein, a surface of the third beam splitter 730 facing the first beam splitter 710 is provided with a reflective film for the light with the first wavelength, the light with the second wavelength and the light with the fourth wavelength, and a surface of the third beam splitter 730 facing the third light source 30 is provided with an anti-reflection film for the light with the third wavelength. Therefore, in a case where the light with the first wavelength, the light with the second wavelength and the light with the fourth wavelength are reflected by the third beam splitter 730, and the light with the third wavelength is transmitted through the third beam splitter 730, the light with the first wavelength, the light with the second wavelength, the light with the third wavelength and the light with the fourth wavelength can be converged and combined, and the converged light can be emitted from the second light emitting end surface 920. Wherein, the reflective film for the light with the first wavelength, the light with the second wavelength and the light with the fourth wavelength and the anti-reflection film for the light with the third wavelength may be disposed on the same surface of the third beam splitter 730, or may be disposed on both surfaces of the third beam splitter 730 respectively.

Further, the projection optical path includes a number of collimating lens groups 60, the collimating lens groups 60 are at least disposed in the light-emitting direction of one of the first light source 10, the second light source 20, the third light source 30 and the fourth light source 40, corresponding light rays can be accurately emitted to corresponding positions through the collimating lens groups 60. For example, the collimating lens group 60 includes a first collimating lens 610 and a second collimating lens 620, the first collimating lens 610 is disposed opposing the corresponding light source, the second collimating lens is disposed opposing away from the corresponding light source, and the first collimating lens 610 and the second collimating lens 620 are any one of spherical lens, aspheric lens or free-form surface lens. The collimating lens group 60 may also include three collimating lenses, and the three collimating lenses may also be any one of spherical lens, aspheric lens or free-form surface lens.

In addition, in order to reduce the diffusing of the first converged light, the projection optical path further includes a first condenser lens 810, the first condenser lens 810 is disposed in an optical path between the first beam splitter 710 and third beam splitter 730. The first converged light can be converged through the converging effect of the first condenser lens 810, and the diffusing of the first converged light can be reduced while the light with the first wavelength and the second converged light are further mixed.

Further, in order to reduce the diffusing of light, the projection optical path further includes a second condenser lens 820, the second condenser lens 820 is disposed in an optical path between the second beam splitter 720 and third beam splitter 730. The converged light of the light with the second wavelength and the light with the fourth wavelength is emitted to the second condenser lens 820, and the light with the second wavelength and the light with the fourth wavelength can be converged through the converging effect of the second condenser lens 820, thereby reducing the diffusing of the light.

Referring back to FIG. 1, in order to flexibly adjust the installation position of the projection optical path according to the installation space, the second light source 20 and the third light source 30 are disposed on an upper side of an emitting optical path of the light with the first wavelength, the excitation light source 50 is disposed on a lower side of the emitting optical path of the light with the first wavelength, and the first light source 10 and the fourth light source 40 are disposed on a left side of the emitting optical path of the light with the second wavelength, wherein a surface of the first beam splitter 710, a surface of the second beam splitter 720 and a surface of the third beam splitter 730 are parallel to each other. For example, an incidence angle of the light with the first wavelength with respect to a surface of the first beam splitter 710 facing the first light source 10 is 45 degree, and the first beam splitter 710, the second beam splitter 720 and third beam splitter 730 are parallel to each other. This can ensure that the emission and transmission of light are smoothly performed, so that the four paths of light can be effectively converged.

Figure 2:
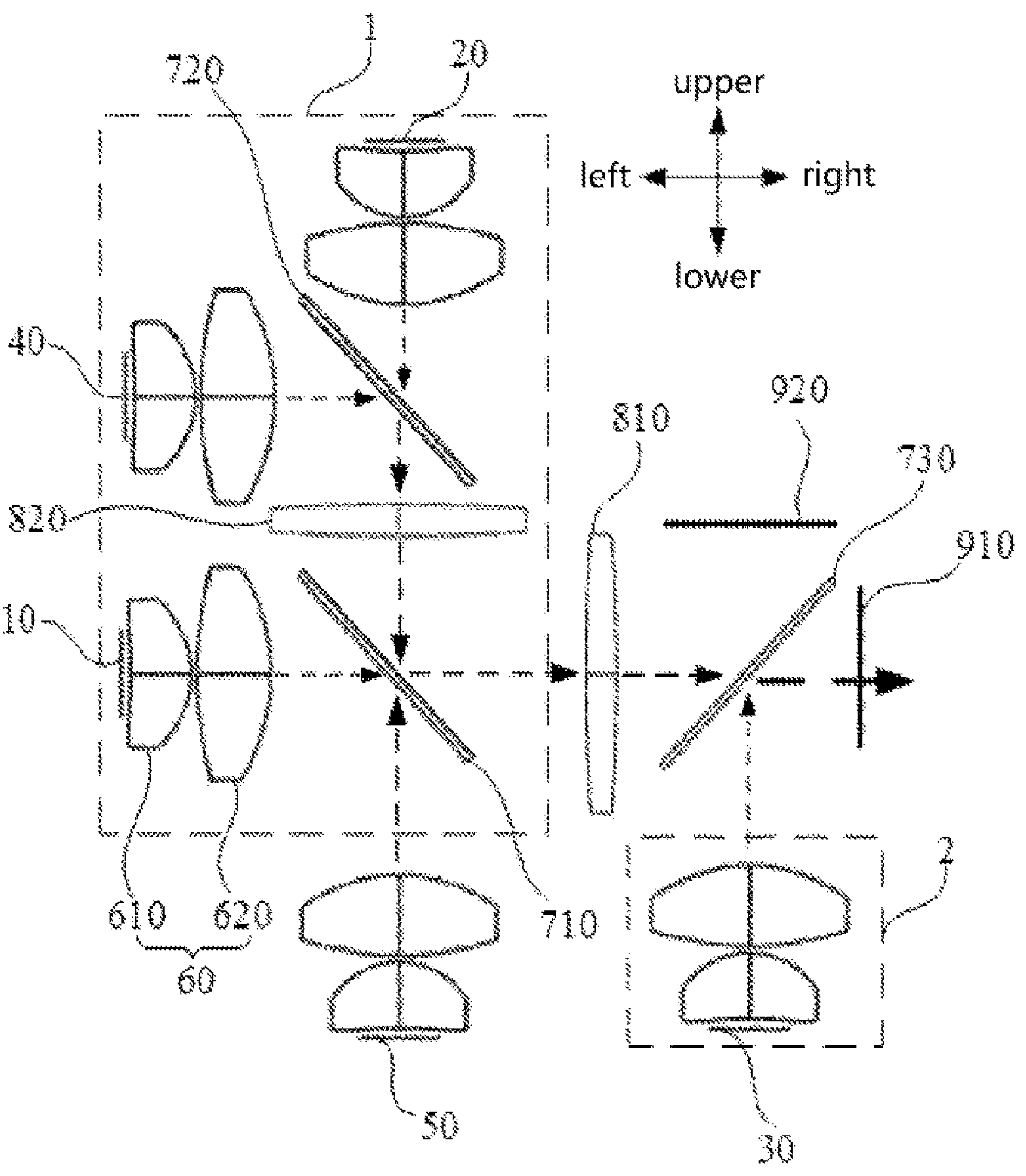
FIG. 2 is a structural schematic diagram of a projection optical path according to a second embodiment of the present disclosure.

Referring to FIG. 2, the second light source 20 is disposed on an upper side of an emitting optical path of the light with the first wavelength, the third light source 30 and the excitation light source 50 are disposed on a lower side of the emitting optical path of the light with the first wavelength, and the first light source 10 and the fourth light source 40 are disposed on a left side of the emitting optical path of the light with the second wavelength, wherein a surface of the first beam splitter 710 and a surface of the second beam splitter 720 are parallel to each other, and the surface of the first beam splitter 710 is orthogonal to a surface of the third beam splitter 730. For example, an incidence angle of the light with the first wavelength with respect to a surface of the first beam splitter 710 facing the first light source 10 is 45 degree, the first beam splitter 710 and the second beam splitter 720 are disposed parallel to each other, and the first beam splitter 710 is disposed orthogonal to the third beam splitter 730 with an angle of 90 degree between them. This can ensure that the emission and transmission of light are smoothly performed, so that the four paths of light can be effectively converged.

Another embodiment may be, the second light source 20 is disposed on an upper side of an emitting optical path of the light with the first wavelength, the third light source 30 and the excitation light source 50 are disposed on a lower side of the emitting optical path of the light with the first wavelength, the first light source 10 is disposed on a left side of the emitting optical path of the light with the second wavelength, and the fourth light source 40 is disposed on a right side of the emitting optical path of the light with the second wavelength, wherein a surface of the second beam splitter 720 and a surface of the third beam splitter 730 are parallel to each other, and a surface of the first beam splitter 710 is orthogonal to the surface of the third beam splitter 730. For example, an incidence angle of the light with the first wavelength with respect to a surface of the first beam splitter 710 facing the first light source 10 is 45 degree, the third beam splitter 730 and the second beam splitter 720 are parallel to each other, and the first beam splitter 710 is disposed orthogonal to the third beam splitter 730 with an angle of 90 degree between them. This can ensure that the emission and transmission of light are smoothly performed, so that the four paths of light can be effectively converged. Further, in the embodiment, in order to avoid the interference influence of the fourth light source 40 on the second light emitting end surface 920, a distance between the first beam splitter 710 and the third beam splitter 730 can be lengthened, so that the second light emitting end surface 920 and the fourth light source 40 can be spaced apart by a certain distance.

The present disclosure also provides a projection device. The projection device includes a housing and the above-mentioned projection optical path, wherein the projection optical path is disposed in the housing. The housing has an installation space, the projection optical path is arranged in the installation space, and the housing can protect the projection optical path and reduce the probability that the optical components in the projection optical path are damaged. In the meanwhile, the housing can also prevent dust from falling into the projection optical path, thereby reducing the influence of dust on the projection optical path. In addition, the housing can also be waterproof, reducing liquids such as rainwater or sweat from penetrating into the projection optical path, so as to prevent the optical components in the projection optical path from being corroded by the liquid.

The various embodiments in this specification are described in a parallel or progressive manner, and each embodiment focuses on the differences from other embodiments, and the same or similar parts between the various embodiments may be referred to each other. As for the device disclosed in the embodiment, since it corresponds to the method disclosed in the embodiment, the description is relatively simple. For relevant parts, please refer to the description of the method.

Those of ordinary skill in the art will understand that the units and algorithm steps of each example described in conjunction with the embodiments disclosed herein can be implemented by electronic hardware, computer software, or a combination thereof. In order to clearly explain the interchangeability of hardware and software, the composition and steps of each example have been generally described in the above descriptions in terms of function. Whether these functions are performed by means of hardware or software depends on the specific application and design constraints of the embodiment. Those skilled in the art may implement the described functions by using different methods for each specific application, but such implementations should not be considered beyond the scope of the present application.

The steps of the method or algorithm described in connection with the embodiments disclosed herein may be directly implemented by hardware, a software module executed by a processor, or a combination thereof. The software module may be disposed in a random access memory (RAM), a memory, a read only memory (ROM), an electrically programmable ROM, an electrically erasable programmable ROM, a register, a hard disk, a removable disk, a CD-ROM, or any other form of storage medium known in the art.

It should be noted that relational terms such as first and second described herein are only used to distinguish one entity or operation from another entity or operation, and do not necessarily require or imply any such actual relationship or order between these entities or operations. Moreover, terms such as "comprise", "include" or any other variation thereof are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "comprising a . . . " does not preclude the presence of additional identical elements in the process, method, article or apparatus including the element.

What is claimed is:

1. A projection optical path system, comprising:

a triple light source system emitting a first converged light;

a single light source system emitting a light with a monochromatic wavelength, wherein the first converged light and the light with the monochromatic wavelength are crossed and converged;

wherein the triple light source system comprises a first light source, a second light source and a fourth light source, the first light source emits a light with a first wavelength, the second light source emits a light with a second wavelength, the fourth light source emits a light with a fourth wavelength, the light with the second wavelength and the light with the fourth wavelength are converged to form a second converged light, the second converged light and the light with the first wavelength are converged to form the first converged light, the single light source system comprises a third light source, the third light source emits a light with a third wavelength, the light with the first wavelength, the light with the second wavelength and the light with the third wavelength have different colors, the light with the first wavelength, the light with the second wavelength, and the light with the third wavelength are respectively one of red light, green light and blue light, and a wavelength range of the light with the fourth wavelength is within a wavelength range of the red light, and wherein a wavelength of the light with the fourth wavelength is defined as $\lambda1$, the wavelength of the red light among the light with the first wavelength, the light with the second wavelength and the light with the third wavelength is $\lambda2$, and $\lambda1 \neq \lambda2$; and an excitation light source emitting an excitation light, wherein the excitation light is emitted to the triple light source system or the single light source system, wherein the triple light source system further comprises a first beam splitter, the first beam splitter is disposed at a crossing position of the second converged light and the light with the first wavelength, and the excitation light source is disposed at a side of the first beam splitter away from the second light source, wherein:

the first light source is a green light source, a surface of the first beam splitter facing the excitation light source is provided with a reflective film for the excitation light, and the excitation light is reflected by the first beam splitter towards the first light source, or the second light source is a green light source, a surface of the first beam splitter facing the excitation light source is provided with an anti-reflection film for the excitation light, and the excitation light is transmitted towards the second light source, wherein the triple light source system further comprises a second beam splitter, the second beam splitter is disposed at a crossing position of the light with the second wavelength and the light with the fourth wavelength, a surface of the second beam splitter facing the second light source is provided with an anti-reflection film for the light with the second wavelength, and a surface of the second beam splitter facing the fourth light source is provided with a reflective film for the light with the fourth wavelength, wherein the projection optical path system further comprises a third beam splitter, the third beam splitter is disposed at a crossing position of the first converged light and the light with the third wavelength, wherein the light with the first wavelength, the light with the second wavelength, the light with the third wavelength and the light with the fourth wavelength are converged by the third beam splitter so as to be emitted, and wherein the light with the first wavelength is a green light, the light with the second wavelength is a red light, the light with the third wavelength is a blue light, a surface of the third beam splitter facing the first light source is provided with an anti-reflection film for the green light and the red light, and a surface of the third beam splitter facing the third light source is provided with a reflective film for the blue light.

2. The projection optical path system of claim 1, wherein the second light source and the third light source are disposed on an upper side of an emitting optical path of the light with the first wavelength, the excitation light source is disposed on a lower side of the emitting optical path of the light with the first wavelength, the first light source and the fourth light source are disposed on a left side of an emitting optical path of the light with the second wavelength, and a surface of the first beam splitter, a surface of the second beam splitter and a surface of the third beam splitter are parallel to each other.

3. The projection optical path system of claim 1, wherein the second light source is disposed on an upper side of an emitting optical path of the light with the first wavelength, the third light source and the excitation light source are disposed on a lower side of the emitting optical path of the light with the first wavelength, the first light source and the fourth light source are disposed on a left side of an emitting optical path of the light with the second wavelength, a surface of the first beam splitter and a surface of the second beam splitter are parallel to each other, and the surface of the first beam splitter is orthogonal to a surface of the third beam splitter.

4. The projection optical path system of claim 1, wherein the second light source is disposed on an upper side of an emitting optical path of the light with the first wavelength, the third light source and the excitation light source are disposed on a lower side of the emitting optical path of the light with the first wavelength, the first light source is disposed on a left side of an emitting optical path of the light with the second wavelength, the fourth light source is disposed on a right side of the emitting optical path of the light with the second wavelength, a surface of the second beam splitter and a surface of the third beam splitter are parallel to each other, and a surface of the first beam splitter is orthogonal to the surface of the third beam splitter.

5. The projection optical path system of claim 1, further comprising a first light emitting end surface, wherein the first light emitting end surface is perpendicular to an emitting direction of the light with the first wavelength, the light with the first wavelength, the light with the second wavelength and the light with the fourth wavelength are transmitted through the third beam splitter, the light with the third wavelength is reflected by the third beam splitter, the light with the first wavelength, the light with the second wavelength, the light with the third wavelength and the light with the fourth wavelength are converged by the third beam splitter, and the converged light of the light with the first wavelength, the light with the second wavelength, the light with the third wavelength and the light with the fourth wavelength is emitted from the first light emitting end surface.

6. The projection optical path system of claim 1, further comprising a second light emitting end surface, wherein the second light emitting end surface is parallel to an emitting direction of the light with the first wavelength, the light with the first wavelength, the light with the second wavelength and the light with the fourth wavelength are reflected by the third beam splitter, the light with the third wavelength is transmitted through the third beam splitter, the light with the first wavelength, the light with the second wavelength, the light with the third wavelength and the light with the fourth wavelength are converged by the third beam splitter, and the converged light of the light with the first wavelength, the light with the second wavelength, the light with the third wavelength and the light with the fourth wavelength is emitted from the second light emitting end surface.

7. A projection device, comprising a housing and the projection optical path system of claim 1, wherein the projection optical path system is disposed in the housing.

* * * * *